Patented Mar. 8, 1938

2,110,842

UNITED STATES PATENT OFFICE 2,110,842

WEED KILLING PROCESS

Ivan L. Ressler, Niagara Falls, N. Y., assignor to E. I. du Pont de Nemours & Company, Wilmington, Del., a corporation of Delaware No Drawing. Application October 8, 1934, Serial No. 747,401

8 Claims. (Cl. 167—45)

This invention relates to the destruction of weeds by chemical means.

Various methods for killing weeds have been proposed heretofore which utilize aqueous saline solutions which are sprayed on or otherwise contacted with the vegetation to be destroyed. Such methods of weed killing result in extensive destruction of the weed vegetation which appears above the ground but usually fail to kill the root systems of hardy perennial plants such as dandelions, wild carrots, plantain and the like. As a result, such perennial weeds tend to grow and send up new shoots even though the vegetation above ground has been entirely destroyed. Furthermore, the saline spray method is not well suited to killing of weeds in lawns, gardens, and the like where it is desired to kill the weeds without destroying or injuring surrounding vegetation and where it is undesirable to add saline material to the soil.

An object of the present invention is to provide an improved method for killing weeds which is adapted to destroy the entire root systems of perennial weed plants. Other objects will be apparent from the following description of my invention.

I have discovered that when trichlorethylene or other chlorohydrocarbon is applied to the root crown of a weed in small amounts, it causes complete destruction of the plants including the entire root system. In order to achieve this result, it is not necessary to spread the chlorohydrocarbon over the entire surface of the plant vegetation; it is only necessary to place a small amount of the chlorohydrocarbon on the root crown of the plant or on such portion of the plant that the chlorohydrocarbon may flow down onto the root crown. After such application, there is no immediate visible change in the plant but within a period of time which may vary from a few hours to a few days, the leaves of the plant begin to darken and finally become withered. Within about one week, the entire root system of the plant is entirely killed. As a rule, a single application to a plant is sufficient to accomplish this purpose.

Any suitable method for applying the chlorohydrocarbon to the weeds may be utilized in practicing my invention. In killing weeds in lawns and gardens where it is desired to avoid injury to surrounding vegetation, I prefer to apply from 0.25 to 5 cc. of the chlorohydrocarbon to the crown of each plant which is to be killed. In the case of plants like dandelions, wild carrots, and the like where the leaves all grow from the root crown, it is suitable to apply the chlorohydrocarbon at the center part of the plant from whence it will quickly flow down onto the root crown. The application can be made with a common oil can or other suitable device for applying the required amount of liquid to the desired spot. Other methods of application may be used, for example, the chlorohydrocarbon may be sprayed or otherwise distributed over a weedy area. In order to obtain the maximum weed killing effect, I prefer to apply the chlorohydrocarbon at a time when the foliage of the weeds is substantially dry.

In addition to trichlorethylene, other similar chlorohydrocarbons which are suitable for practicing my invention are, for example, liquid chlorohydrocarbons such as tetrachlorethane, carbon tetrachloride and pentachlorethane. These substances do not need to be of high purity to be effective; their crude or impure forms will give satisfactory results. The chlorohydrocarbons also may be diluted with known solvents and such solutions used in accordance with my invention.

An advantage of my herein described method resides in the fact that the chlorohydrocarbons, when applied to a single weed, do not penetrate into the soil and cause injury to the roots of surrounding grass or other desirable vegetation. A further advantage is that in order to obtain the maximum weed-killing effect by my method, it is not necessary to bruise or cut the foliage or roots of the weeds as is the case with some well-known weed killers, e. g., copperas solution.

I claim:

1. A method of killing weeds, which comprises applying thereto a saturated chlorinated aliphatic hydrocarbon.

2. A method of killing weeds, which comprises applying thereto a liquid saturated chlorinated aliphatic hydrocarbon.

3. A method of killing weeds, which comprises applying thereto tetrachlorethane.

4. A method of killing perennial weeds, which comprises applying a saturated chlorinated aliphatic hydrocarbon to the root crowns of weed plants.

5. A method of killing perennial weeds, which comprises applying a liquid saturated chlorinated aliphatic hydrocarbon to the root crowns of weed plants.

6. A method of killing perennial weeds, which comprises applying tetrachlorethane to the root crowns of weed plants.

7. A weed killing composition comprising a saturated chlorinated aliphatic hydrocarbon.

8. A weed killing composition comprising tetrachlorethane.

IVAN L. RESSLER.